United States Patent
Hemingway et al.

(10) Patent No.: US 10,655,359 B2
(45) Date of Patent: May 19, 2020

(54) POST INSTALLATION TEMPLATING ASSEMBLY

(71) Applicants: Joshua Hemingway, Silver Lake, IN (US); Christina Fouts, Silver Lake, IN (US)

(72) Inventors: Joshua Hemingway, Silver Lake, IN (US); Christina Fouts, Silver Lake, IN (US)

( * ) Notice: Subject to any disclaimer, the term of this patent is extended or adjusted under 35 U.S.C. 154(b) by 231 days.

(21) Appl. No.: 15/834,285

(22) Filed: Dec. 7, 2017

(65) Prior Publication Data

US 2019/0177999 A1 Jun. 13, 2019

(51) Int. Cl.
*E04H 17/26* (2006.01)
*G01C 9/02* (2006.01)

(52) U.S. Cl.
CPC ............ *E04H 17/263* (2013.01); *G01C 9/02* (2013.01)

(58) Field of Classification Search
CPC ........ E04H 17/263; G01D 21/00; G01B 3/30; G01B 5/25; G01C 9/02
USPC .................. 33/1 G, 333, 613, 562, 1 H, 566
See application file for complete search history.

(56) References Cited

U.S. PATENT DOCUMENTS

| | | | | |
|---|---|---|---|---|
| 4,754,553 A * | 7/1988 | Simpson | ................ | G01C 15/00 33/1 H |
| 4,976,040 A * | 12/1990 | Mish | ........................ | G01C 9/28 33/372 |
| 5,163,233 A * | 11/1992 | Benson | ............... | E04G 21/1841 269/904 |
| 5,431,372 A * | 7/1995 | Kostelecky | ........... | E01F 13/022 182/45 |
| 5,594,669 A * | 1/1997 | Heger | ...................... | G01C 9/06 33/343 |
| 5,961,242 A * | 10/1999 | Leone | ................. | E04H 17/1421 248/228.1 |
| 6,178,651 B1 * | 1/2001 | Yancey | ............... | E04G 21/1833 248/156 |
| 6,658,753 B2 * | 12/2003 | Tatarnic | ................... | G01C 9/28 33/613 |
| 7,726,037 B1 * | 6/2010 | Jordan | .................... | E04H 17/20 33/613 |
| 7,946,052 B2 * | 5/2011 | Stevens | ................... | E04G 17/14 33/645 |
| 8,307,565 B2 * | 11/2012 | Knudsen | .................. | G01D 1/00 33/613 |
| 2016/0024791 A1 * | 1/2016 | Reno | ........................ | E04C 3/02 33/613 |

* cited by examiner

*Primary Examiner* — Christopher W Fulton

(57) ABSTRACT

A post installation templating assembly for positioning fence posts for setting includes a bar and a pair of brackets. Each bracket is coupled to and extends perpendicularly from a respective opposing end of the bar. Each bracket is configured to selectively couple to a respective post to parallelly position a pair of posts perpendicularly to the bar. The bar is configured to fixedly separate the pair of posts so that the pair of posts can be set with a separation equivalent to a distance between the pair of brackets.

8 Claims, 6 Drawing Sheets

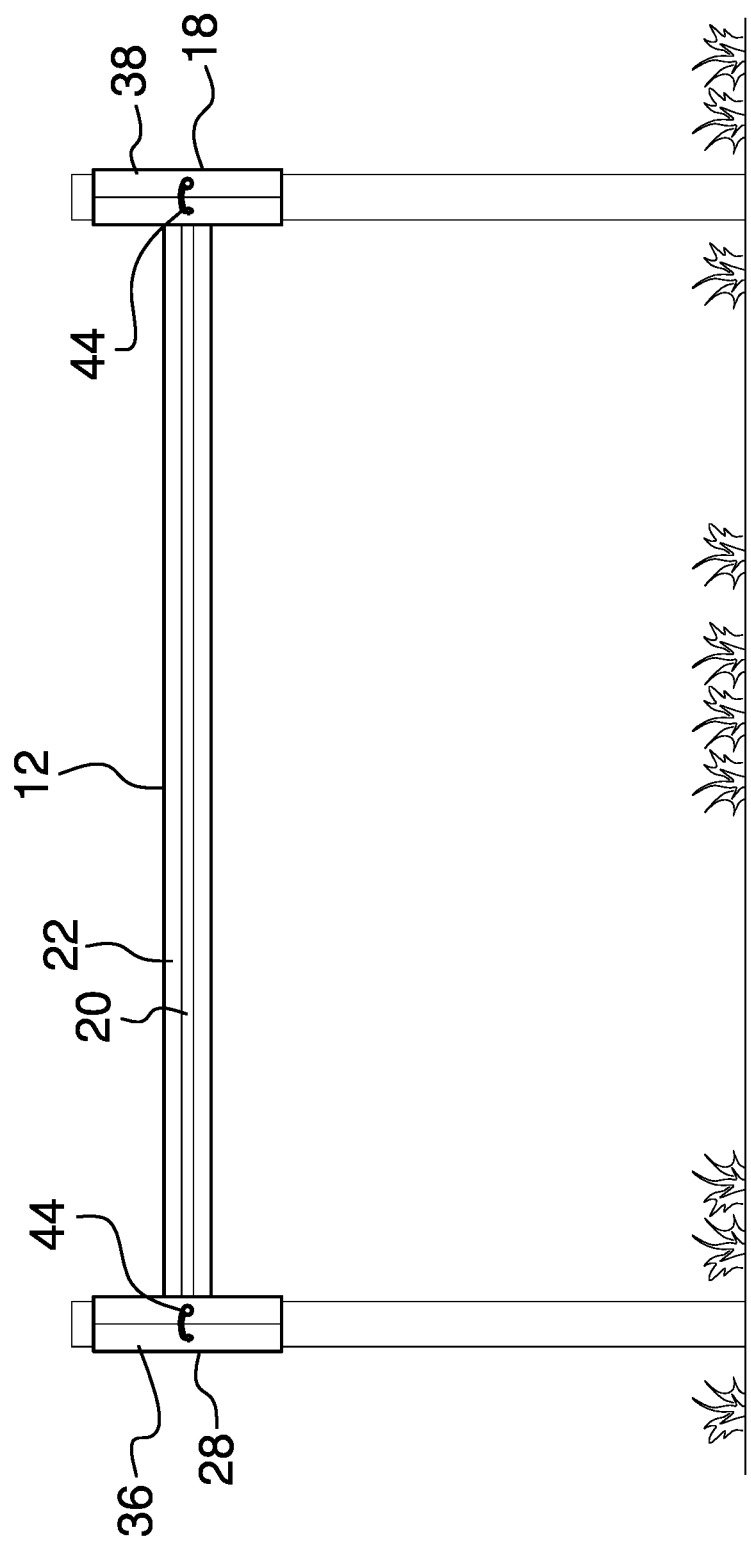

POST INSTALLATION TEMPLATING ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION (1) Field of the Invention
(2) Description of Related Art Including Information Disclosed Under 37 CFR 1.97 and 1.98.

The disclosure and prior art relates to templating assemblies and more particularly pertains to a new templating assembly for positioning fence posts for setting.

(h) BRIEF SUMMARY OF THE INVENTION

An embodiment of the disclosure meets the needs presented above by generally comprising a bar and a pair of brackets. Each bracket is coupled to and extends perpendicularly from a respective opposing end of the bar. Each bracket is configured to selectively couple to a respective post to parallelly position a pair of posts perpendicularly to the bar. The bar is configured to fixedly separate the pair of posts so that the pair of posts can be set with a separation equivalent to a distance between the pair of brackets.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 7 is an in-use view of an embodiment of the disclosure.

(j) DETAILED DESCRIPTION OF THE INVENTION

Figure 1:
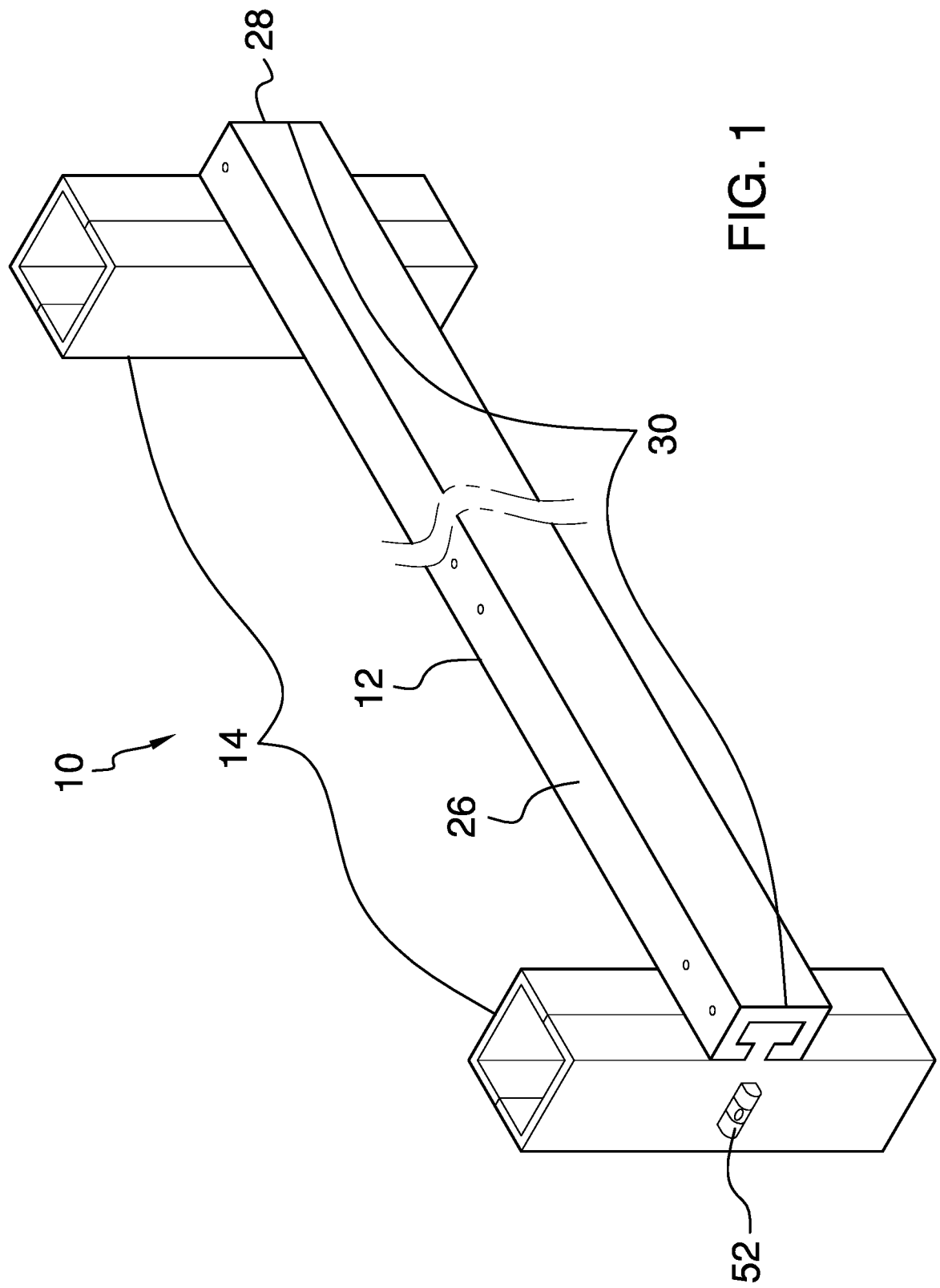
FIG. 1 is an isometric perspective view of a post installation templating assembly according to an embodiment of the disclosure.
Figure 2:
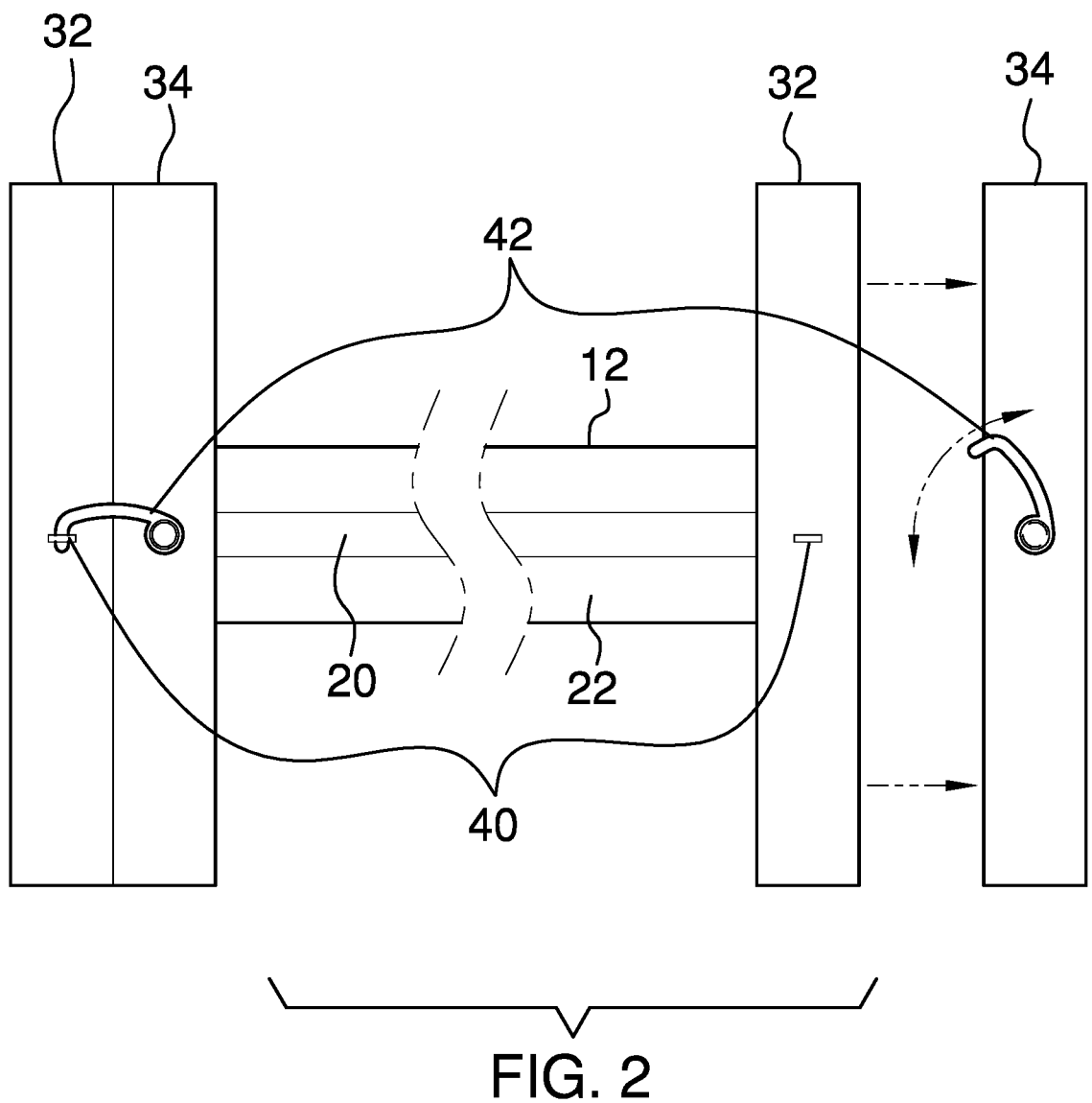
FIG. 2 is a front view of an embodiment of the disclosure.
Figure 3:
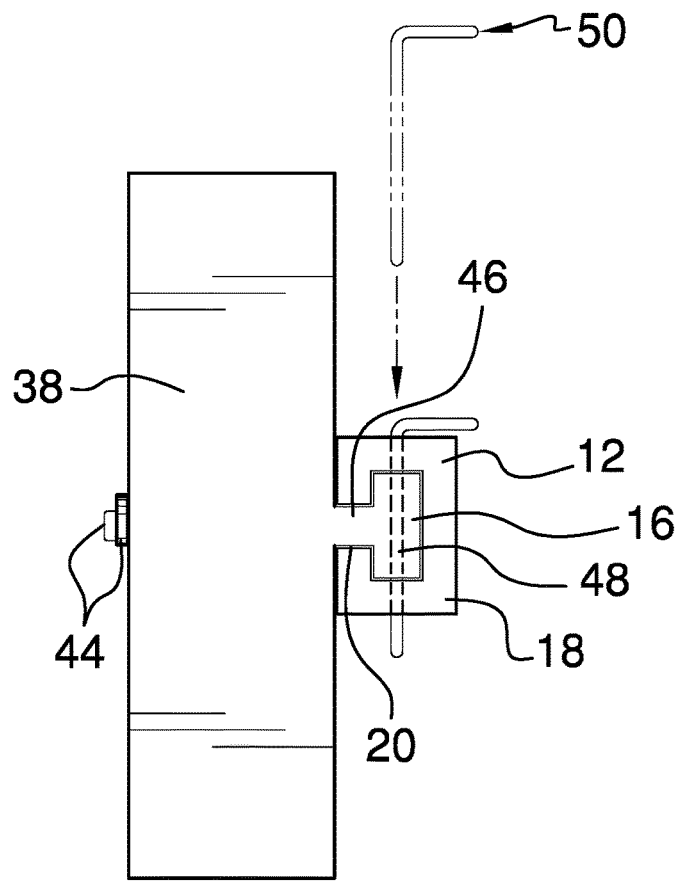
FIG. 3 is an end view of an embodiment of the disclosure.
Figure 4:
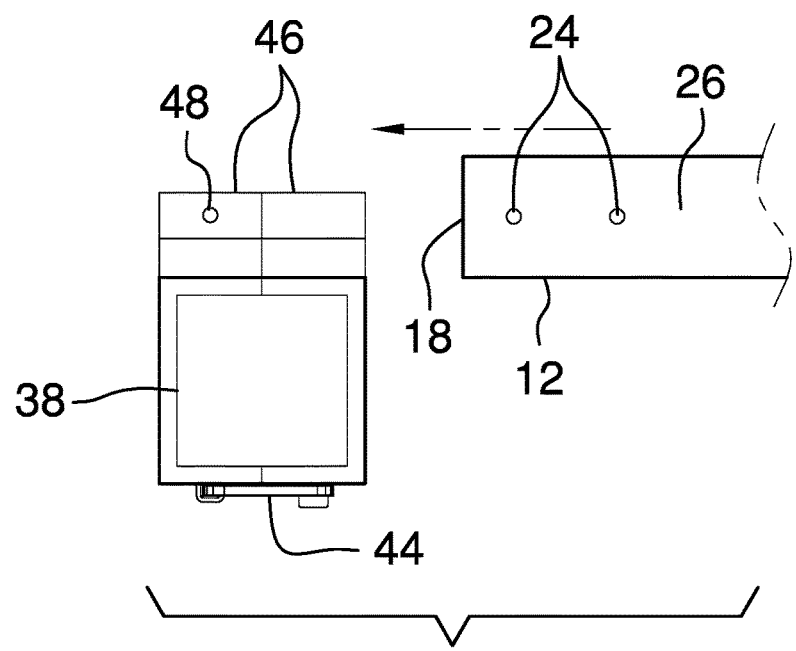
FIG. 4 is a top view of an embodiment of the disclosure.
Figure 5:
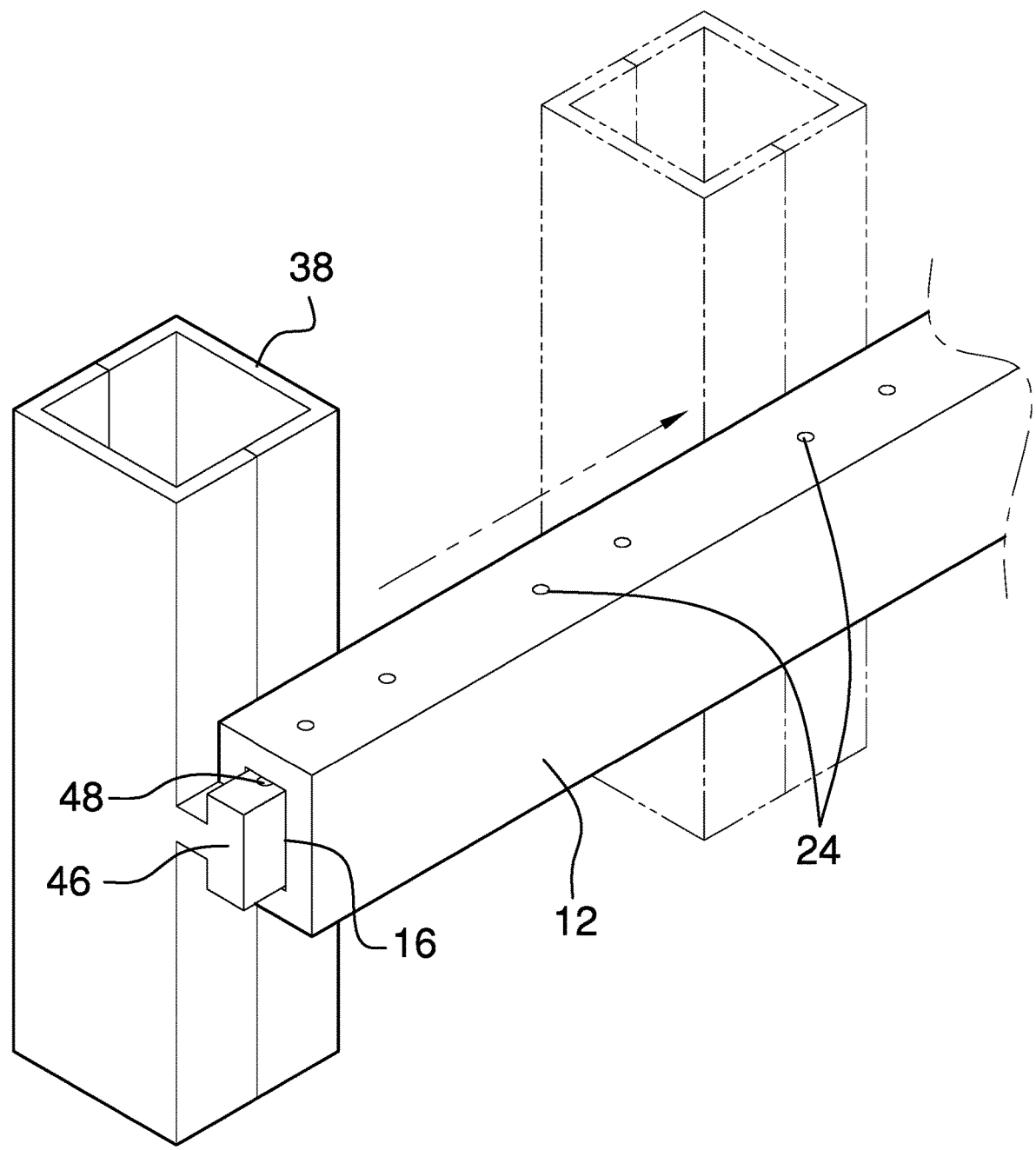
FIG. 5 is an isometric perspective view of an embodiment of the disclosure.
Figure 6:
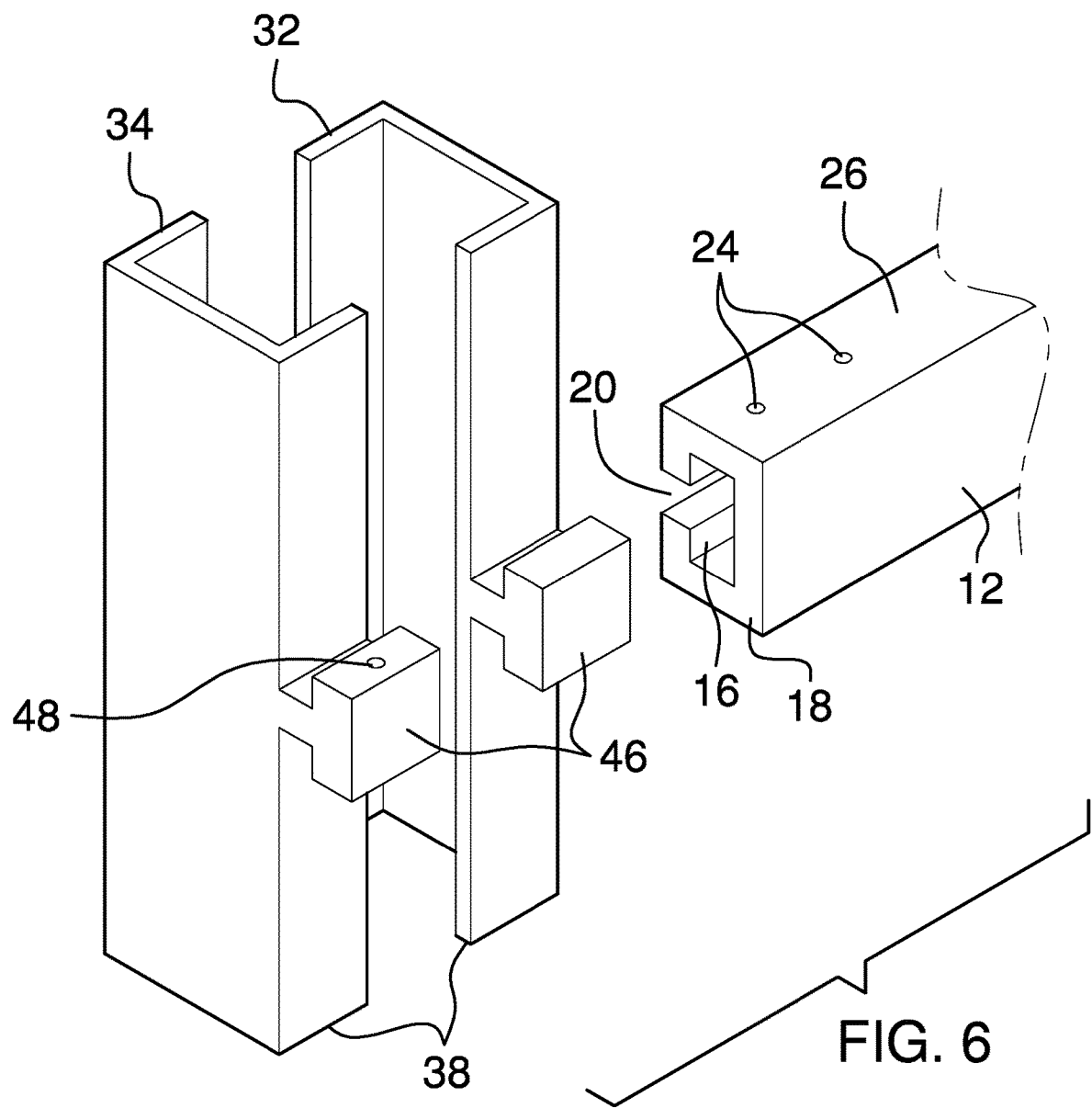
FIG. 6 is an isometric perspective view of an embodiment of the disclosure.

With reference now to the drawings, and in particular to FIGS. 1 through 7 thereof, a new templating assembly embodying the principles and concepts of an embodiment of the disclosure and generally designated by the reference numeral 10 will be described.

As best illustrated in FIGS. 1 through 7, the post installation templating assembly 10 generally comprises a bar 12 and a pair of brackets 14. A first channel 16 is axially positioned in the bar 12. The first channel 16 extends from a second end 18 of the bar 12. In one embodiment, the bar 12 is rectangularly shaped when viewed longitudinally. In another embodiment, the first channel 16 is rectangularly shaped when viewed longitudinally.

A slot 20 is positioned in a side 22 of the bar 12. The slot 20 extends to the first channel 16. A plurality of holes 24 is positioned in a top 26 of the bar 12. Each hole 24 extends to the first channel 16. The plurality of holes 24 extends from proximate to the second end 18 toward a first end 28 of the bar 12.

Each bracket 14 is coupled to and extends perpendicularly from a respective opposing end 30 of the bar 12. Each bracket 14 is configured to selectively couple to a respective post to parallelly position a pair of posts perpendicularly to the bar 12. The bar 12 is configured to fixedly separate the pair of posts so that the pair of posts can be set with a separation equivalent to a distance between the pair of brackets 14.

In one embodiment, the brackets 14 are squarely shaped when viewed longitudinally. Each bracket 14 comprises a first section 32 that is selectively couplable to a second section 34. The first section 32 and the second section 34 are separable to insert the respective post. The first section 32 and the second section 34 are couplable to couple the bracket 14 to the respective post. The pair of brackets 14 comprises a first clamp 36 that is fixedly coupled to the first end 28 of the bar 12 and a second clamp 38 that is slidably couplable to the bar 12. The distance between the first clamp 36 and the second clamp 38 is selectively adjustable.

A pair of first connectors 40 is coupled singly to the first sections 32 of the brackets 14. A pair of second connectors 42 is coupled singly to the second sections 34 of the brackets 14. The second connectors 42 are complementary to the first connectors 40. Each second connector 42 is positioned to couple to a respective first connector 40 to couple a respective bracket 14 to the respective post. The pair of posts is configured to be set with the separation equivalent to the distance between the brackets 14. The second connector 42 is positioned to decouple from the respective first connector 40 to release the respective bracket 14 from the respective post. In one embodiment, each second connector 42 and the respective first connector 40 comprise a swivel latch 44.

A pair of extrusions 46 is coupled singly to and extends from the first section 32 and the second section 34 of the second clamp 38. Each extrusion 46 is complementary to the first channel 16 and the slot 20. The extrusions 46 are positioned to insert into the slot 20 and the first channel 16 from the second end 18 of the bar 12 to slidably couple the second clamp 38 to the bar 12.

A second channel 48 is positioned through a respective extrusion 46. The second channel 48 is complementary to the holes 24. The second channel 48 is positioned to selectively align with a respective hole 24. A pin 50 that is complementary to the holes 24 and the second channel 48 is positioned to be inserted through the respective hole 24 and the second channel 48 to fixedly position the second clamp 38 relative to the first clamp 36.

At least one level 52 is coupled to a respective bracket 14. The at least one level 52 is configured to determine a plumbness of the post that is positioned in the respective bracket 14.

In use, the first section 32 and the second section 34 are separable to insert the respective post. Each second connector 42 is positioned to couple to the respective first connector 40 to couple the respective bracket 14 to the respective post. The extrusions 46 that are positioned on the second clamp 38 are positioned to insert into the slot 20 and the channel from the second end 18 of the bar 12. The second clamp 38 is slidably coupled to the bar 12. The second channel 48 that is positioned in the respective extrusion 46 is positioned to selectively align with a respective hole 24. The pin 50 is positioned to be inserted through the respective hole 24 and the second channel 48 to fixedly position the second clamp 38 relative to the first clamp 36. The at least one level 52 is configured to determine the plumbness of the post that is positioned in the respective bracket 14. The pair of posts is configured to be set with the separation equivalent to the distance between the first clamp 36 and the second clamp 38. The second connector 42 is positioned to decouple from the respective first connector 40 to release the respective bracket 14 from the respective post.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A post installation templating assembly comprising:
   a bar;
   a pair of brackets, each said bracket being coupled to and extending perpendicularly from a respective opposing end of said bar, each said bracket being configured for selectively coupling to a respective post, each said bracket comprising
      a first section selectively couplable to a second section such that said first section and said second section are separable for inserting the respective post and such that said first section and said second section are couplable for coupling said bracket to the respective post, and
      a first clamp fixedly coupled to said first end of said bar and a second clamp slidably couplable to said bar such that the distance between said first clamp and said second clamp is selectively adjustable;
   wherein said brackets are positioned on said bar such that each said bracket is configured for coupling to the respective post for parallelly positioning a pair of posts perpendicularly to said bar such that said bar is configured for fixedly separating the pair of posts for setting the pair of posts with a separation equivalent to a distance between said pair of brackets;
   a first channel axially positioned in said bar, said first channel extending from a second end of said bar;
   a slot positioned in a side of said bar, said slot extending to said first channel;
   a plurality of holes positioned in a top of said bar, each said hole extending to said first channel, said plurality of holes extending from proximate to said second end toward a first end of said bar;
   a pair of extrusions coupled singly to and extending from said first section and said second section of said second clamp, each said extrusion being complementary to said first channel and said slot;
   a second channel positioned through a respective said extrusion, said second channel being complementary to said holes;
   a pin complementary to said holes and said second channel; and
   wherein said extrusions are positioned on said second clamp such that said extrusions are positioned for inserting into said slot and said first channel from said second end of said bar for slidably coupling said second clamp to said bar, wherein said second channel is positioned in said respective said extrusion such that said second channel is positioned for selectively aligning with a respective said hole positioning said pin for inserting through said respective said hole and said second channel for fixedly positioning said second clamp relative to said first clamp.

2. The assembly of claim 1, further including said bar being rectangularly shaped when viewed longitudinally.

3. The assembly of claim 1, further including said brackets being squarely shaped when viewed longitudinally.

4. The assembly of claim 1, further comprising:
   a pair of first connectors coupled singly to said first sections of said brackets;
   a pair of second connectors coupled singly to said second sections of said brackets, said second connectors being complementary to said first connectors; and
   wherein said second connectors are positioned on said second sections such that each said second connector is positioned for coupling to a respective said first connector for coupling a respective said bracket to the respective post for setting the pair of posts with the separation equivalent to the distance between said brackets, such that said second connector is positioned for decoupling from said respective said first connector for releasing said respective said bracket from the respective post.

5. The assembly of claim 4, further including each said second connector and said respective said first connector comprising a swivel latch.

6. The assembly of claim 1, further including said first channel being rectangularly shaped when viewed longitudinally.

7. The assembly of claim 1, further including at least one level coupled to a respective said bracket, wherein said at least one level is positioned on said respective said bracket such that said at least one level is configured for determining a plumbness of the post positioned in said respective said bracket.

8. A post installation templating assembly comprising:
- a bar, said bar being rectangularly shaped when viewed longitudinally;
- a first channel axially positioned in said bar, said first channel extending from a second end of said bar, said first channel being rectangularly shaped when viewed longitudinally;
- a slot positioned in a side of said bar, said slot extending to said first channel;
- a plurality of holes positioned in a top of said bar, each said hole extending to said first channel, said plurality of holes extending from proximate to said second end toward a first end of said bar;
- a pair of brackets, each said bracket being coupled to and extending perpendicularly from a respective opposing end of said bar, each said bracket being configured for selectively coupling to a respective post, wherein said brackets are positioned on said bar such that each said bracket is configured for coupling to the respective post for parallelly positioning a pair of posts perpendicularly to said bar such that said bar is configured for fixedly separating the pair of posts for setting the pair of posts with a separation equivalent to a distance between said pair of brackets, said brackets being squarely shaped when viewed longitudinally, each said bracket comprising a first section selectively couplable to a second section such that said first section and said second section are separable for inserting the respective post and such that said first section and said second section are couplable for coupling said bracket to the respective post, said pair of brackets comprising a first clamp fixedly coupled to said first end of said bar and a second clamp slidably couplable to said bar such that the distance between said first clamp and said second clamp is selectively adjustable;
- a pair of first connectors coupled singly to said first sections of said brackets;
- a pair of second connectors coupled singly to said second sections of said brackets, said second connectors being complementary to said first connectors, wherein said second connectors are positioned on said second sections such that each said second connector is positioned for coupling to a respective said first connector for coupling a respective said bracket to the respective post for setting the pair of posts with the separation equivalent to the distance between said brackets, such that said second connector is positioned for decoupling from said respective said first connector for releasing said respective said bracket from the respective post, each said second connector and said respective said first connector comprising a swivel latch;
- a pair of extrusions coupled singly to and extending from said first section and said second section of said second clamp, each said extrusion being complementary to said first channel and said slot, wherein said extrusions are positioned on said second clamp such that said extrusions are positioned for inserting into said slot and said first channel from said second end of said bar for slidably coupling said second clamp to said bar;
- a second channel positioned through a respective said extrusion, said second channel being complementary to said holes;
- a pin complementary to said holes and said second channel, wherein said second channel is positioned in said respective said extrusion such that said second channel is positioned for selectively aligning with a respective said hole positioning said pin for inserting through said respective said hole and said second channel for fixedly positioning said second clamp relative to said first clamp;
- at least one level coupled to a respective said bracket, wherein said at least one level is positioned on said respective said bracket such that said at least one level is configured for determining a plumbness of the post positioned in said respective said bracket; and
- wherein said first section and said second section are separable for inserting the respective post, wherein said second connectors are positioned on said second sections such that each said second connector is positioned for coupling to said respective said first connector for coupling said respective said bracket to the respective post, wherein said extrusions are positioned on said second clamp such that said extrusions are positioned for inserting into said slot and said first channel from said second end of said bar for slidably coupling said second clamp to said bar, wherein said second channel is positioned in said respective said extrusion such that said second channel is positioned for selectively aligning with said respective said hole positioning said pin for inserting through said respective said hole and said second channel for fixedly positioning said second clamp relative to said first clamp for setting the pair of posts with the separation equivalent to the distance between said first clamp and said second clamp, wherein said at least one level is positioned on said respective said bracket such that said at least one level is configured for determining the plumbness of the post positioned in said respective said bracket, wherein said second connector is positioned for decoupling from said respective said first connector for releasing said respective said bracket from the respective post.

\* \* \* \* \*